J. H. BEST.
DISPLAY RACK.
APPLICATION FILED SEPT. 14, 1908.
936,855.
Patented Oct. 12, 1909.
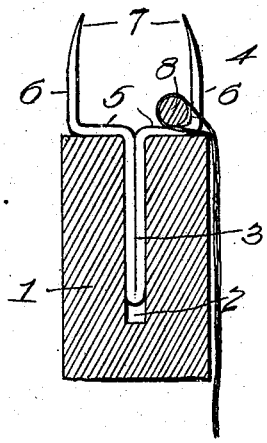
Fig. 2.
Fig. 1.
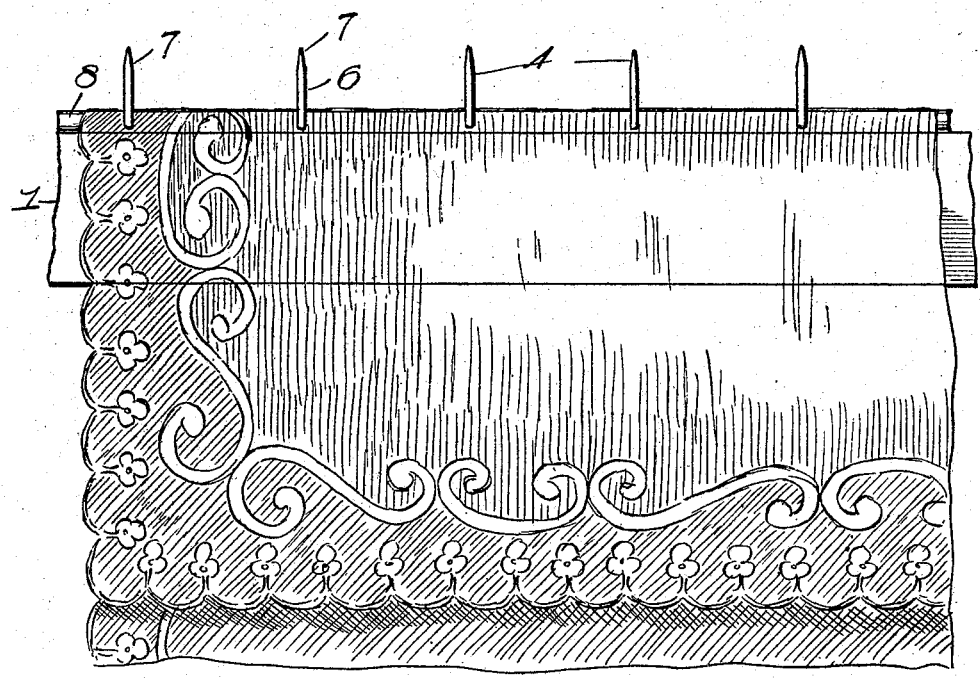
Witnesses
P. L. McAhee
T. E. Burner.
Inventor
John H. Best.
Edson Bros
Attorneys

UNITED STATES PATENT OFFICE.

JOHN H. BEST, OF GALVA, ILLINOIS.

DISPLAY-RACK.

936,855.　　　　　Specification of Letters Patent.　　Patented Oct. 12, 1909.

Application filed September 14, 1908. Serial No. 452,862.

*To all whom it may concern:*

Be it known that I, JOHN H. BEST, a citizen of the United States, residing at Galva, in the county of Henry and State of Illinois, have invented certain new and useful Improvements in Display-Racks; and I do hereby declare the following to be a full, clear, and exact description of the invention, such as will enable others skilled in the art to which it appertains to make and use the same.

My invention relates to display racks and is especially designed for exhibiting lace curtains and draperies.

It has for its object to provide a rack from which thin draperies may be hung for display without danger of their becoming torn.

The invention consists in the features of construction and combination of devices hereinafter described and specified in the claims.

In the accompanying drawings, illustrating the preferred embodiment of my invention: Figure 1 is a side view of an arm of a display rack supporting a lace curtain, and Fig. 2 is an enlarged cross section thereof.

Referring more particularly to the drawing, 1 designates the arm in which the sockets 2 are formed to receive the shanks 3 of the pins 4. The bearing portions 5 of said pins are bent at right angles to the shank portions so as to form a straight bearing across the upper edge of the arm, but the angle of said bearing portions may be varied if found desirable. The hook portions 6 are shown bent substantially at right angles to the bearing portions but the angles of these may also be changed to suit requirements. The upper pointed ends 7 of said hook portions are bent inwardly as illustrated so that their extremities are arranged out of vertical alinement with the upright or angular parts of said hook portions.

The curtain or drapery is laid over a rod 8 which is then placed upon the arm between the hook portions of the pins. The bending of the pointed ends of the hook portions inwardly helps to hold the rod in place and prevents them from engaging or catching in the curtains or draperies hanging on the adjacent arms.

I claim:

1. The combination, with an arm of a display rack, of a series of pins secured to the upper face of said arm and having upwardly extending hook portions near each edge, and a rod arranged between said hook portions on the upper face of said arm for the purpose specified.

2. The combination, with an arm of a display rack, of a series of pins secured to the upper face of said arm and having upwardly extending hook portions near each edge, the pointed ends of said hook portions being bent inwardly toward each other, and a rod arranged between said hook portions on the upper face of said arm for the purpose specified.

In testimony whereof, I affix my signature, in presence of two witnesses.

JOHN H. BEST.

Witnesses:
　OLEF A. SWANSON,
　JOHN WILLIAMS.